(12) United States Patent
Kato

(10) Patent No.: US 6,979,162 B2
(45) Date of Patent: Dec. 27, 2005

(54) PLASTIC CLIP FOR CONNECTING A PANEL TO A BODY

(75) Inventor: Hiroyuki Kato, Ninomiya-machi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/669,800

(22) Filed: Sep. 25, 2003

(65) Prior Publication Data

US 2004/0109737 A1    Jun. 10, 2004

(30) Foreign Application Priority Data

Sep. 27, 2002   (JP)   .............................. 2002-283489

(51) Int. Cl.⁷ .......................... F16B 13/06; F16B 33/00
(52) U.S. Cl. ...................... 411/371.1; 411/45; 411/542
(58) Field of Search ............................ 411/371.1, 41, 411/45, 46, 47, 48, 542

(56) References Cited

U.S. PATENT DOCUMENTS

| | | | |
|---|---|---|---|
| 3,667,340 A | 6/1972 | Black et al. | .................... 85/71 |
| 4,170,920 A * | 10/1979 | Siebol | .......................... 411/43 |
| 5,211,519 A * | 5/1993 | Saito | ............................. 411/45 |
| 5,568,675 A * | 10/1996 | Asami et al. | .................. 24/453 |
| 5,846,040 A | 12/1998 | Ueno | .......................... 411/45 |
| 6,039,523 A * | 3/2000 | Kraus | .......................... 411/48 |
| 6,514,024 B2 * | 2/2003 | Akema et al. | ................ 411/48 |
| 2004/0052609 A1 * | 3/2004 | Kraus | ......................... 411/353 |

FOREIGN PATENT DOCUMENTS

| | | | | |
|---|---|---|---|---|
| DE | 3903780 A1 * | 8/1990 | ............ | F16J 15/10 |
| EP | 0 682 186 | 11/1995 | | |
| JP | 63-115907 | 7/1988 | | |
| JP | 6-24220 | 3/1994 | | |
| JP | 8-177824 | 7/1996 | | |
| JP | 200173513 A * | 3/2001 | ........... | E04D 13/03 |

* cited by examiner

*Primary Examiner*—Katherine Mitchell
(74) *Attorney, Agent, or Firm*—Miles & Stockbridge P.C.

(57) ABSTRACT

A pin-and-bushing clip connects a panel member to a body while providing a water-tight seal between the panel member and the body and between a pin head and a bushing flange. Appropriate and limited pressing force is applied to seal members even when a strong pressing force is applied to the pin head.

6 Claims, 4 Drawing Sheets

PLASTIC CLIP FOR CONNECTING A PANEL TO A BODY

CROSS REFERENCE TO RELATED APPLICATION

This application claims the benefit of Japanese Patent Application No. 2002-283489 filed Sep. 27, 2002, incorporated herein by reference.

BACKGROUND OF THE INVENTION

This invention relates to a plastic clip comprising a pin and bushing for connecting members such as panels to a body such as a car body.

Plastic clips for connecting a member such as a panel to a body such as a car body are well known. Japanese Unexamined Patent Application No. 8-177824 discloses a pin-and-bushing plastic clip comprising a pin with a head and a shank extending from the head, and a bushing with a flange and a shank extending from the flange. A through-hole is formed in the bushing flange and shank for inserting the pin shank. The pin shank is inserted into the through-hole, and the pin is connected to the bushing with a fixed interval between the pin head and the bushing flange. A hole in a member such as a panel is aligned with a hole in a body such as a car body; the bushing shank is inserted into the aligned holes; the bushing flange is brought into contact with the member; the pin shank is pushed in until the pin head makes contact with the bushing flange; the diameter of the bushing shank expands; and the expanded diameter bushing shank and flange connect the member to the body. A first water-tight seal is situated between the pin head and the bushing flange, and a second water-tight seal is situated between the bushing flange and the member to form a water-tight seal between the pin and the bushing as well as between the bushing and the member.

Japanese Unexamined Utility Model Application No. 6-24220 discloses a plastic screw grommet comprising a flange and a hollow shank. A tapping screw is screwed into the flange hole and hollow shank, thereby expanding the diameter of the shank and attaching the screw grommet to a body such as a car body. In this screw grommet, a special thermoplastic seal washer is situated where the flange comes into contact with the car body. By heat softening the washer, a seal can be formed between the surface of the flange and the surface of the car body.

Japanese Unexamined Utility Model Application No. 63-115907 discloses another plastic screw grommet comprising a flange and a hollow shank. A tapping screw is screwed into a flange hole and the hollow shank, thereby expanding the diameter of the shank and attaching the screw grommet to a body such as a car body. In this screw grommet, too, a soft seal washer is situated where the flange comes into contact with the car body to create a seal between the surface of the flange and the surface of the car body. Opposing edges of the flange have shape-retaining ribs to retain the shape of the flange making contact with the car body even when pressure on the soft seal washer would otherwise deform it.

The pin and bushing type clip described in Japanese Unexamined Patent Application No. 8-177824 has a water tight seal member situated between the pin head and the bushing flange to form a water tight seal between the pin and the bushing. However, if a worker applies too much force when pushing the pin into the bushing, the soft seal member can become deformed and broken. Also, a rebounding force may damage the elasticity of the seal member and reduce the longevity of the water-tight seal.

The plastic screw grommet described in Japanese Unexamined Utility Model Application No. 6-24220 has a special thermoplastic seal washer situated where the flange comes into contact with the car body, and a tight seal is formed between the surface of the flange and the surface of the car body by heat softening the washer. However, this requires a special heat softening process.

The plastic screw grommet described in Japanese Unexamined Utility Model Application No. 63-115907 has shape-retaining ribs on the flange to prevent unstable contact between the soft seal member and the surface of the car body and to retain the shape of the flange and screw grommet itself. While these shape retaining ribs tend to prevent excessive deformation of the seal member, they are not always effective to maintain the sealing function of the seal member.

BRIEF DESCRIPTION OF THE INVENTION

The present invention provides a clip having a water-tight seal member between a pin head and a bushing flange, in which appropriate and limited pressing force is applied to the seal member even when a strong pressing force is applied to the pin head.

In an embodiment of the present invention, a clip for connecting a member such as a panel to a body such as a car body comprises a pin with a head and a shank extending from the head, and a bushing with a flange and a shank extending from the flange. The flange and the bushing shank have a through-hole for insertion of the pin shank. The bushing shank expands radially when the pin shank is inserted into the through-hole and the pin head approaches the flange. A water-tight seal member is formed between the pin head and the flange. A stop is formed on at least the pin head or the flange to keep the compressed thickness of the seal member constant when the pin shank is inserted into the through-hole to press the seal member between the pin head and the flange.

Because this pin-and-bushing clip has a stop for keeping the compression thickness of the water-tight seal member constant when the pin shank is inserted into the bushing through-hole and the water-tight seal member is pressed between the pin head and the bushing flange, the seal member sustains an appropriate amount of pressure even when strong pressure is applied to the pin head, e.g., when a worker applies excessive force. As a result, the seal member does not become deformed or broken, and the lifespan of the water-tight function of the seal member is maintained. The material of the seal member does not have to be a special thermoplastic material, and a heat softening process does not have to be performed.

In an embodiment of the invention, the pin head is a round plate smaller in diameter than the diameter of the bushing flange, and the stop has plate portions protruding diametrically from the pin head. An outer wall is formed on the outer edge of the bushing flange at a height to provide a constant compressed thickness when the outer wall contacts the stop. In this clip, the outer wall creates a round recess for accommodating the water-tight seal member on the inside. A gap can be formed between the outer edge of the pin head and the outer wall of the bushing flange, except where the stop is located, so that the end of a tool can be inserted in the gap to remove the clip.

The pin and bushing are initially connected with the pin shank partially inserted into the bushing shank to a nonexpanded-diameter connection position where the diameter of the bushing shank does not expand. Then the pin shank can be inserted completely into the bushing shank to an expanded-diameter-connection position where the diameter of the bushing shank expands. The pin head is pushed toward the bushing flange by a single pressing maneuver of a worker's finger, in order to move from the non-expanded-diameter-connection position to the expanded-diameter-connection position and in order to connect a member such as a panel to a body such as a car body. The clip of the present invention may thus be termed a "one-push clip".

BRIEF DESCRIPTION OF THE DRAWINGS

The invention will be further described in conjunction with the accompanying drawings, which illustrate a preferred (best mode) embodiment of the invention, and wherein.

DETAILED DESCRIPTION OF THE INVENTION

Figure 1:
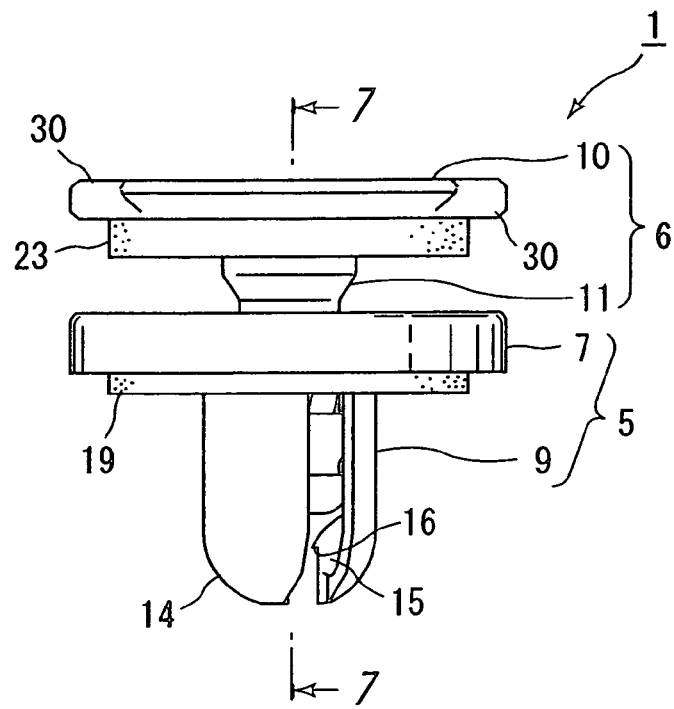
FIG. 1 is a front side elevation view of a clip in accordance with an embodiment of the invention.

As shown in the drawings, in an embodiment of the invention, a clip 1 comprises a bushing 5 and a pin 6, each of which is preferably formed integrally of molded plastic. Bushing 5 comprises a round flange 7 and a shank 9 extending therefrom. Pin 6 comprises a round flange-shaped head 10 and a shank 11 extending therefrom. The bushing flange 7 and the bushing shank 9 have an axial through-hole 13 for insertion of the pin shank 11. See FIG. 3. The diameter of the bushing flange 7 is larger than a mounting hole in members and a body to be connected by the clip. A tip section 14 of the bushing shank 9 is tapered for easier insertion of the bushing shank in the mounting hole.

Figure 3:
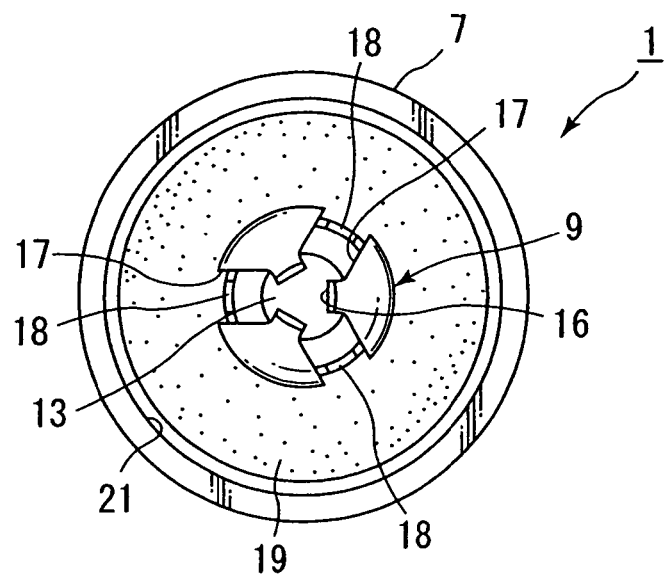
FIG. 3 is a bottom plan view of the clip.
Figure 4:
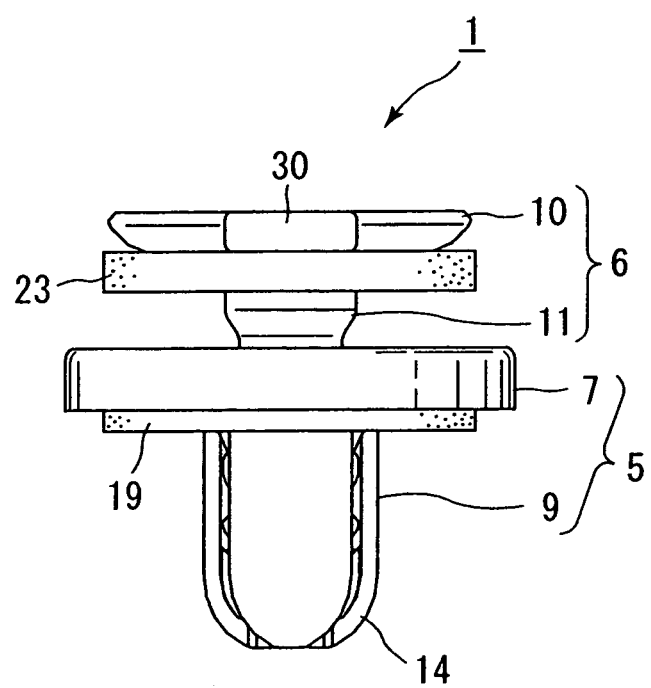
FIG. 4 is a right-side elevation view of the clip.

As shown in FIG. 3, The bushing shank 9 has three slits 17 formed circumferentially at 120-degree intervals and extending from the bushing flange 7 lengthwise to the tip section 14, splitting the bushing shank 9 into three legs. When the bushing shank is inserted into a mounting hole in members and a body to be join d, the bushing shank bends inwardly for easy insertion.

The tip section 14 of the bushing shank has three internal ribs 15 at 120-degree intervals circumferentially. As described later, the tip section 14 expands diametrically outward when the pin shank 11 is inserted substantially completely into the bushing shank 9 and reaches an expanded-diameter-connection position. A small shoulder 16 is formed at the tip of each rib 15, and when the pin shank 11 is inserted substantially completely into the bushing shank 9, shoulders near the tip of the pin shank 11 engages the shoulders 16, and the pin 6 and bushing 5 stay in the expanded-diameter-connection position.

Figure 2:
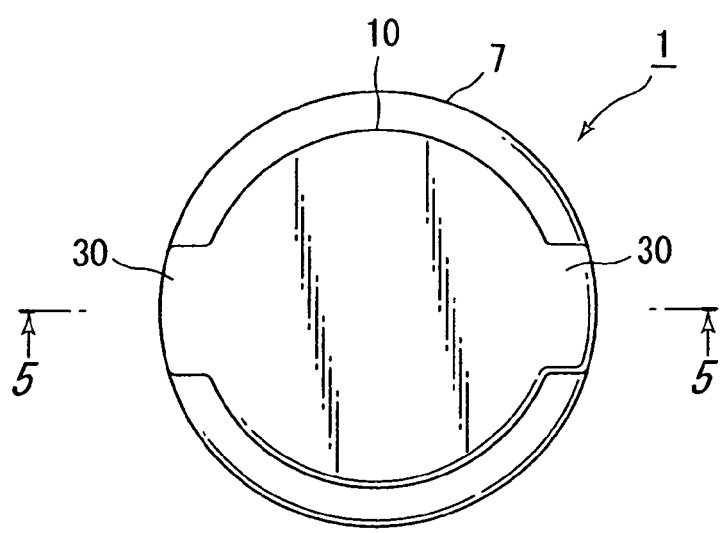
FIG. 2 is a top plan view of the clip.
Figure 5:
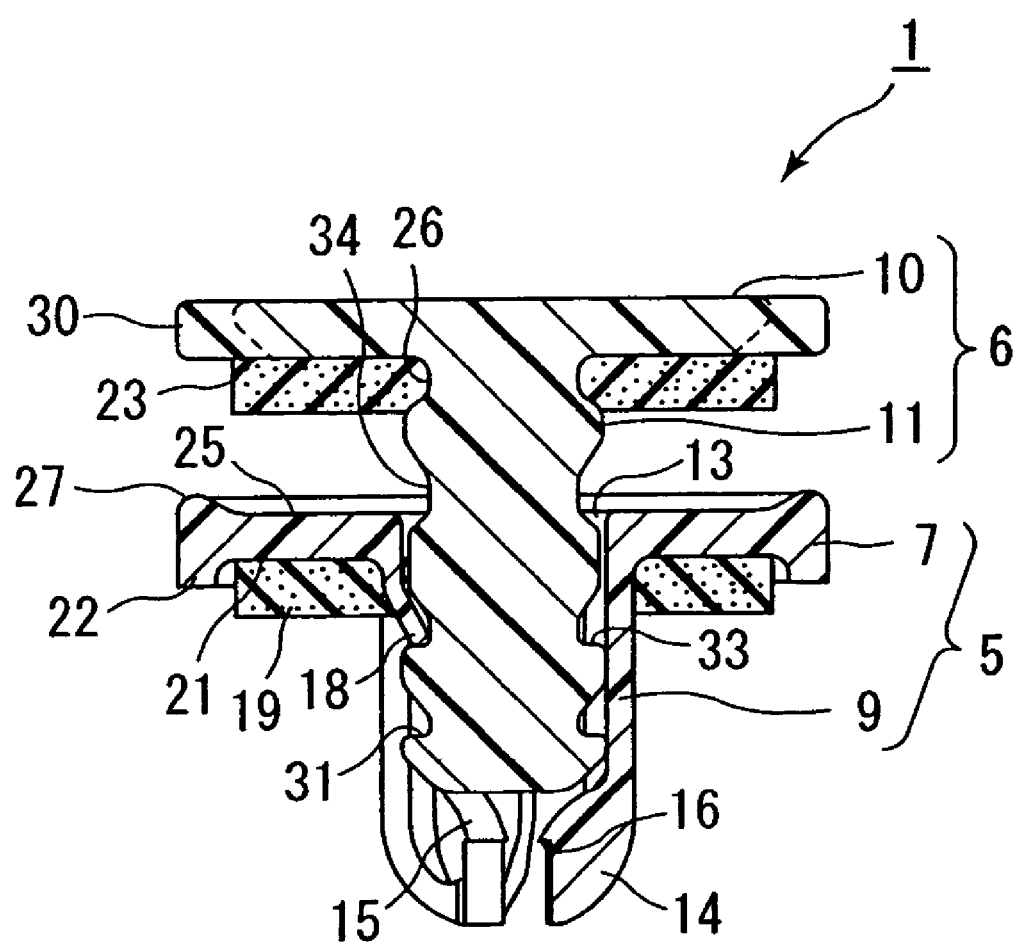
FIG. 5 is a sectional view of the clip taken along line 5—5 in FIG. 2.
Figure 6:
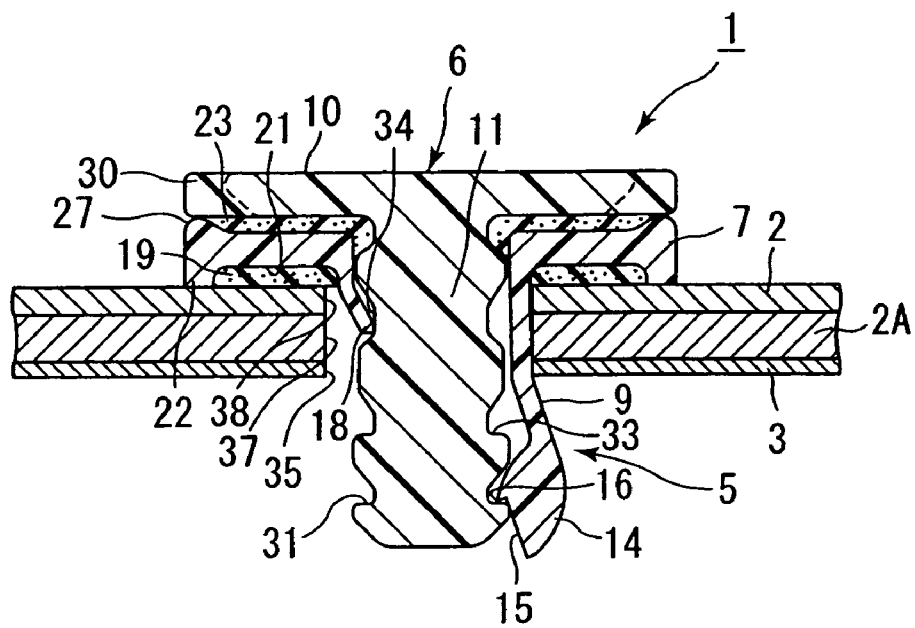
FIG. 6 is a sectional view taken along line 5—5 in FIG. 2 and showing members connected to a body by the clip.

In the slits 17, resilient pawls 18 extend radially inward from the bushing shank 9 at the flange end of the slits 17, as shown in FIGS. 2, 5, and 6. The pawls 18 engage a groove 33 in the pin shank 11 as the pin shank 11 is partially inserted into the bushing shank 9, to maintain a non-expanded-diameter-connection position in which the pin 6 and the bushing 5 are connected but the bushing shank 9 is not expanded. When the pin shank 11 is inserted substantially completely into the bushing shank 9 to the expanded-diameter-connection position, the pawls 18 enter a pawl-retaining groove 34 in the pin shank 11, to disengage from the pin shank.

As shown in FIG. 5, the bushing flange 7 has a first seal member 19 for forming a water-tight seal between the bushing flange 7 and a member such as a panel. The first seal member 19 is made of a soft elastic material appropriate for a water-tight seal. It is preferably connected to the bushing flange 7 using an adhesive although heat melting can be used. The first seal member 19 has a hole slightly smaller in diameter than the bushing shank 9 for frictionally engaging the bushing shank. A first recess 21 is formed in one side of the bushing flange 7 with a predetermined depth to accommodate the first seal member 19.

The outer edge of the first recess 21 has an outer wall of predetermined height to ensure that the first seal member 19 is compressed to a constant compression thickness when the bushing flange 7 is pressed onto a member such as a panel. Thus, only an appropriate amount of pressure can be exerted on the first seal member 19, and the first seal member is not deformed and broken even when excessive force is applied to the bushing flange 7.

A second recess 25 is formed in the opposite side of the bushing flange 7 to accommodate a second seal member 23 for forming a second water-tight seal between the bushing flange 7 and the pin head 10. The second seal member 23 is also made of a soft elastic material suitable for water-tight seals. The second seal member 23 is preferably connected to the pin head 10 using an adhesive, although heat melting can be employed. The second seal member 23 has a hole smaller in diameter than the pin shank 11 for frictionally engaging the pin shank. In the embodiment, the pin shank 11 has a groove 26 near the pin head 10 in which the second seal member 23 is located.

The second recess 25 is formed on the bushing flange 7 with a predetermined depth so that only an appropriate amount of pressure can be brought to bear on the second seal member 23 even when strong force is applied to the pin head 10. The outer edge of the second recess 25 has an outer wall 27 of predetermined height to ensure that the second seal member 23 is compressed to a constant compression thickness when the pin head 10 is pressed onto the bushing flange 7, so the compression is not exceeded. Thus, when the pin head 10 is brought into contact with the outer wall 27 of the second recess 25, the pressure cannot exceed a predetermined level, and only an appropriate amount of pressure can be applied to the second seal member 23, which cannot be deformed and broken even when excessive force is applied to insert the pin head 10 onto the bushing flange 7.

Figure 7:
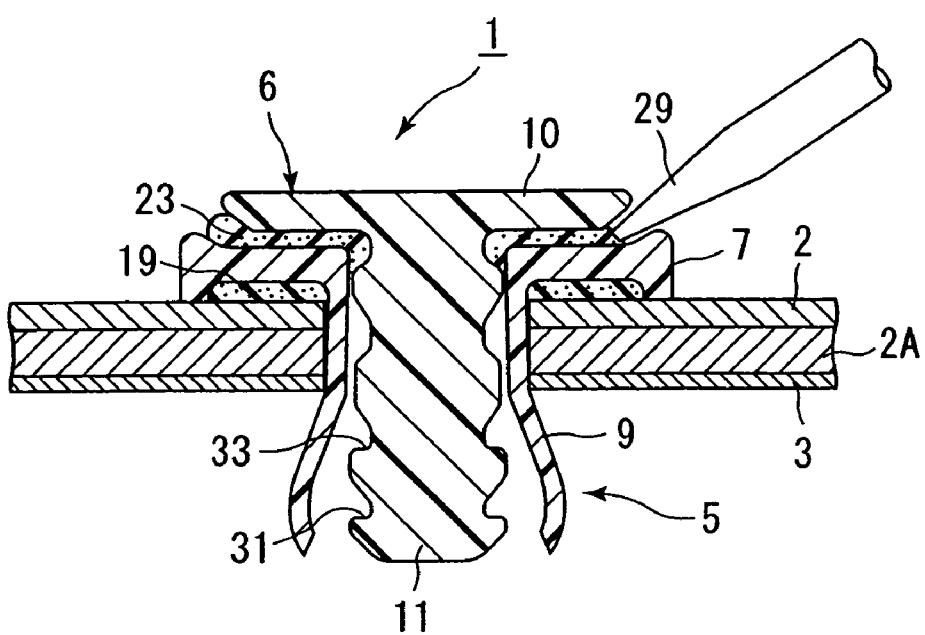
FIG. 7 is a sectional view taken along line 7—7 in FIG. 1 and showing how to remove the connection shown in FIG. 6.

In the embodiment, the round plate-shaped head 10 of the pin 6 has a diameter that is smaller than the diameter of the bushing flange 7. As shown in FIG. 7, a gap having a diameter the same as the pin head 10 but smaller than the diameter of the bushing flange 7 can be formed so that the end of a tool 29 (e.g., a flat blade screwdriver) can be inserted in the gap to remove the pin head 10 from the bushing flange 7. The outer edge of the pin head 10 can be tapered, with a smaller diameter toward the bushing flange 7, to form the gap for insertion of the end of the tool 29.

When the second seal member 23 is pressed between the pin head 10 and the bushing flange 7 by pressure on the pin head 10, the second seal member 23 can be compressed to a fixed compression thickness by virtue of a pair of stop plates 30 extending diametrically from the pin head 10. When the pin head 10 approaches the bushing flange 7, the stop plates 30 engage the outer wall 27 of the second recess 25 to limit the movement of the pin head 10 toward the bushing flange 7. This ensures that the second seal member 23 is subjected only to the appropriate amount of pressure. Other types of stops can be used. For example, the second recess formed in the bushing flange 7 can instead be formed in the pin head 10, with the outer wall of the second recess serving as the stop. Also, second recesses can be formed in both the bushing flange 7 and the pin head 10 to accommodate the second seal member, and the height of the outer walls of the two second recesses can be selected to ensure the desired compressed thickness of the second seal member.

The length of the pin shank 11 can be such that the tip of the pin shank reaches the tip of the bushing shank 9 when the pin shank is fully inserted in the bushing shank, as shown in FIG. 6. As shown in FIG. 5, in the embodiment the pin shank 11 has four grooves spaced axially at intervals. From the tip, the grooves include an expanded-diameter-connection groove 31, a non-expanded-diameter-connection groove 33, a pawl-retaining groove 34, and a groove 26 for receiving the second seal member 23. When the pin shank 11 is inserted substantially completely into the bushing shank 9, a shoulder in the expanded-diameter-connection groove 31 at the tip of the pin shank 11 engages the shoulders 16 formed on the ribs 15, and the pin 6 and bushing 5 are kept in the expanded-diameter-connection position.

When the pin shank 11 is initially inserted into the bushing shank 9, the pawls 18 engage a shoulder in the non-expanded-diameter-connection groove 33, as shown in FIG. 5, to keep the pin 6 and the bushing 5 in the non-expanded-diameter-connection position. The pawl-retaining groove 34 accommodates the pawls 18 without distortion when the pin shank 11 is inserted substantially completely into the bushing shank 9 in the expanded-diameter-connection position, as shown in FIG. 6.

The expanded-diameter-connection position is the position where a member such as a panel is connected to a body such as a car body. The expanded-diameter-connection position is often maintained for years. If the pawls 18 were subjected to a distorting force over a long period of time, creeping deformation of the pawls could occur, and a non-expanded-diameter-connection position could not be obtained when the clip is removed. When the pawl-retaining groove 34 accommodates the pawls 18 in the expanded-diameter-connection position, creeping deformation of the pawls can be prevented.

Clip 1, comprising bushing 5 and pin 6, can be handled as a single component when connected in the non-expanded diameter-connection position shown in FIG. 5. As shown in FIG. 6, when a panel member 2A and a panel member 2 are overlapped and connected to a body 3 such as a car body using clip 1, mounting hole 35 in body 3, mounting hole 37 in member 2A, and mounting hole 38 in member 2 are aligned, and the bushing shank 9 is inserted into the aligned mounting holes. The first seal member 19 on the bottom of the bushing flange 7 is brought into contact with the member 2. When a worker's finger presses strongly on the pin head 10, in this state, the pin shank 11 is inserted substantially completely into the bushing shank 7. The expanded-diameter-connection groove 31 in the pin shank 11 then engages the shoulders 16 on the three ribs 15 inside the tip section 14 of the bushing shank 9, and the pin 6 and the bushing 5 are maintained in the expanded-diameter-connection position, in which the diameter of the tip section 14 in the bushing shank 9 is expanded and the diameter of other sections of the bushing shank are also expanded. The expanded diameter sections of the bushing shank, and the bushing flange 7, connect the overlapped members 2A, 2 to the body 3.

In the expanded-diameter-connection position, the first seal member 19 is pressed down to the appropriate constant compression thickness by the first recess 21 and the outer wall 22, so as to function as a water-tight seal between the bushing flange 7 and the member 2. The second seal member 23 is pressed down to the appropriate constant compression thickness by the second recess 25 and the outer wall 27 to function as a water-tight seal between the bushing flange 7 and the pin head 10. The stop plates 30 engage the outer wall 27 of the second recess 25, to ensure that only the appropriate amount of pressure is applied to the second seal member 23, keeping the second seal member 23 from becoming deformed and broken even when excessive force is applied to the bushing flange 7 from the pin head 10. As a result, the sealing function of the second seal member 23 is maintained for a long time.

The pin 6 and bushing 5 can be removed as a single unit to release the connection between members 2, 2A and body 3. As shown in FIG. 7, the end of a tool 29 can be inserted into the gap between the pin head 10 and the bushing flange 7 to lift the pin head 10 from the bushing flange. The shoulders 16 on the ribs 15 of the bushing shank 9 are removed from the expanded-diameter-connection groove 31 at the end of the pin shank 11, and the pin shank 11 is moved relative to the bushing shank 9 until the pawls 18 engage the non-expanded-diameter-connection groove 33 on the pin shank 11 as shown in FIG. 5. Then, the pin shank 11 and the bushing shank 9 are removed from members 2 and 2A and body 3 as a unit, with the pin 6 and the bushing 5 connected in the non-expanded-diameter-connection position.

While a preferred embodiment of the invention has been shown and described, it will be apparent that changes can be made without departing from the principles and spirit of the invention, the scope of which is defined in the accompanying claims.

What is claimed is:

1. A clip for connecting a member to a body, comprising:
a pin with a head and a shank extending longitudinally from the head, the head extending laterally from the shank to an outer periphery of the head;
a bushing with a flange and a shank extending longitudinally from the flange, the flange extending laterally from the shank to an outer periphery of the flange, and with a through-hole in the flange and the bushing shank into which the pin shank is inserted; and
a water-tight seal member on the pin shank adjacent to the head for compression between the pin head and the flange,
wherein a stop is formed on the pin head to keep a predetermined compressed thickness of the seal member when the pin shank is inserted into the through-hole and presses the seal member between the pin head and the flange, wherein the pin head is a plate with circular portions having a diameter smaller than the diameter of the bushing flange, the stop comprises plate portions extending laterally outward from the circular portions of the pin head, and an outer wall is formed at the outer periphery of the bushing flange and is disposed to engage the stop plate portions when the seal member is compressed between the pin head and the flange, and the height of the outer wall is predetermined to provide a predetermined compressed thickness of the seal member.

2. A clip according to claim 1, wherein the flange has a recess surrounded by the outer wall for receiving the seal member.

3. A clip according to claim 2, wherein a gap is formed between the outer periphery of the pin head and the outer wall of the bushing flange, for insertion of a tool for separating the pin head from the flange, said gap being covered where the stop plate portions are located.

4. A clip according to claim 1, wherein the pin shank and the bushing shank have cooperable parts that cause the bushing shank to expand outwardly at an expanded-diameter-connection position when the pin shank is inserted substantially completely into the bushing shank for connecting a member and a body having aligned holes through which the shanks are inserted.

5. A clip according to claim 4, wherein the pin shank and the bushing shank have cooperable parts that connect the shanks in a non-expanded-diameter-connection position in which the bushing shank is not expanded when the pin shank is inserted partially into the bushing shank.

6. A clip according to claim 5, further comprising a second seal member on the bushing shank adjacent to the flange for providing a water-tight seal between the flange and a panel member having a hole into which the bushing shank is inserted, wherein the flange has a recess in which the second seal member is received and that has an outer wall for engaging the panel member and limiting the compression of the second seal member.

\* \* \* \* \*